(12) United States Patent
Mickael

(10) Patent No.: US 7,151,254 B2
(45) Date of Patent: Dec. 19, 2006

(54) LOGGING TOOL WITH RESPONSE INVARIANT TO CHANGES IN BOREHOLE PRESSURE

(75) Inventor: Medhat Mickael, Sugar Land, TX (US)

(73) Assignee: Precision Drilling Technology Services Group, Inc., Calgary (CA)

( * ) Notice: Subject to any disclaimer, the term of this patent is extended or adjusted under 35 U.S.C. 154(b) by 112 days.

(21) Appl. No.: 10/990,174

(22) Filed: Nov. 16, 2004

(65) Prior Publication Data

US 2006/0102834 A1    May 18, 2006

(51) Int. Cl.
*G01V 5/12* (2006.01)
*E21B 47/01* (2006.01)

(52) U.S. Cl. ................ 250/269.3; 250/266; 166/254.2; 175/50

(58) Field of Classification Search ..... 250/253–269.8; 175/41, 50; 166/254.2; 73/152.01–152.62
See application file for complete search history.

(56) References Cited

U.S. PATENT DOCUMENTS

| | | | | |
|---|---|---|---|---|
| 4,048,495 A | * | 9/1977 | Ellis | ........................ 250/264 |
| 5,250,806 A | | 10/1993 | Rhein-Knudsen | |
| 5,451,779 A | * | 9/1995 | Spross et al. | ............... 250/266 |
| 5,659,169 A | * | 8/1997 | Mickael et al. | .......... 250/269.3 |
| 5,753,919 A | * | 5/1998 | Prain et al. | .................. 250/368 |
| 6,666,285 B1 | * | 12/2003 | Jones et al. | .................... 175/50 |
| 6,997,258 B1 | * | 2/2006 | Homan et al. | ........... 166/254.2 |

* cited by examiner

*Primary Examiner*—David Porta
*Assistant Examiner*—Frederick F. Rosenberger
(74) *Attorney, Agent, or Firm*—Wong, Cabello, Lutsch, Rutherford & Brucculeri, L.L.P.

(57) ABSTRACT

A logging system for measuring parameters of earth formation penetrated by a well borehole. Measurements made with the system are not adversely affected by varying pressure encountered a borehole environment. This is accomplished by the use of a main compensation element and a detector compensation element to render source and detector geometry invariant to varying pressure. The system is particularly suited for nuclear LWD systems such as back scatter gamma ray density systems. The basic concepts of the system are, however, applicable to other types of nuclear measurement systems that comprise one or more radiation sources, and one or more axially spaced radiation detectors, where system response is a function of source-detector spacing. The basic concepts of the system are also applicable to other types of logging systems, such as electromagnetic and acoustic, where source (transmitter) and sensor (receiver) elements require invariant geometry in order to maximize accuracy of measurements.

45 Claims, 4 Drawing Sheets

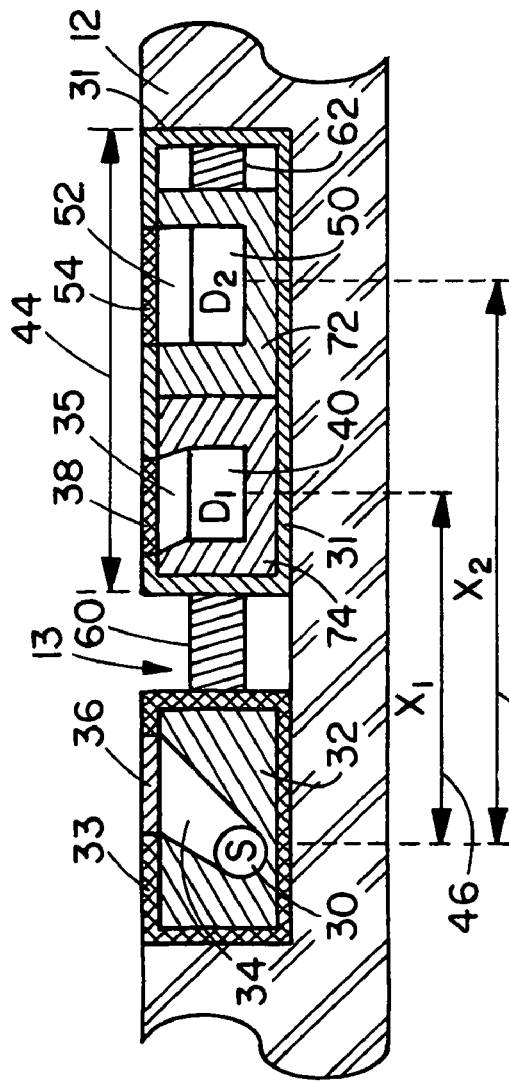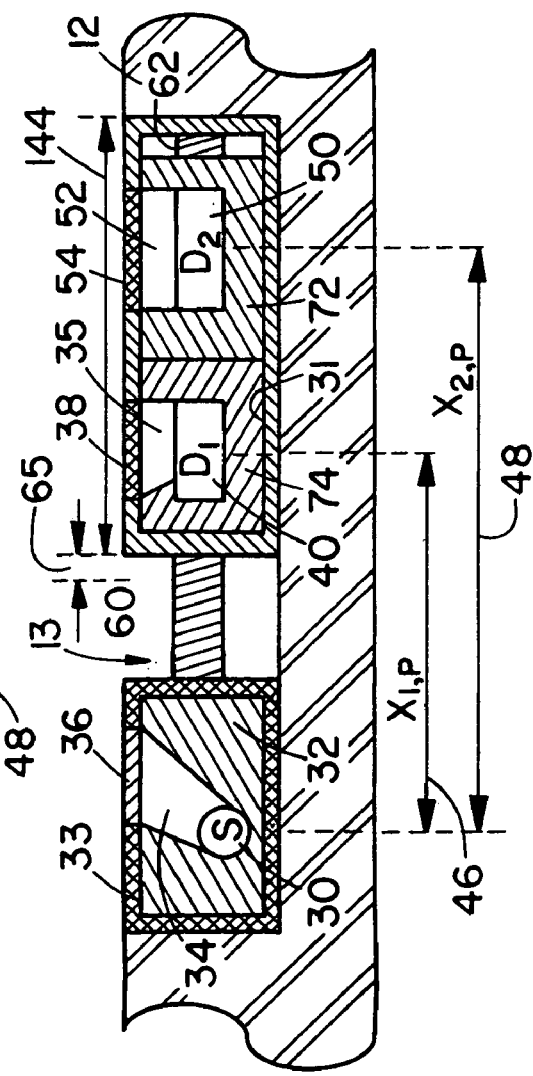
Fig. 3a (PRIOR ART)
Fig. 3b (PRIOR ART)

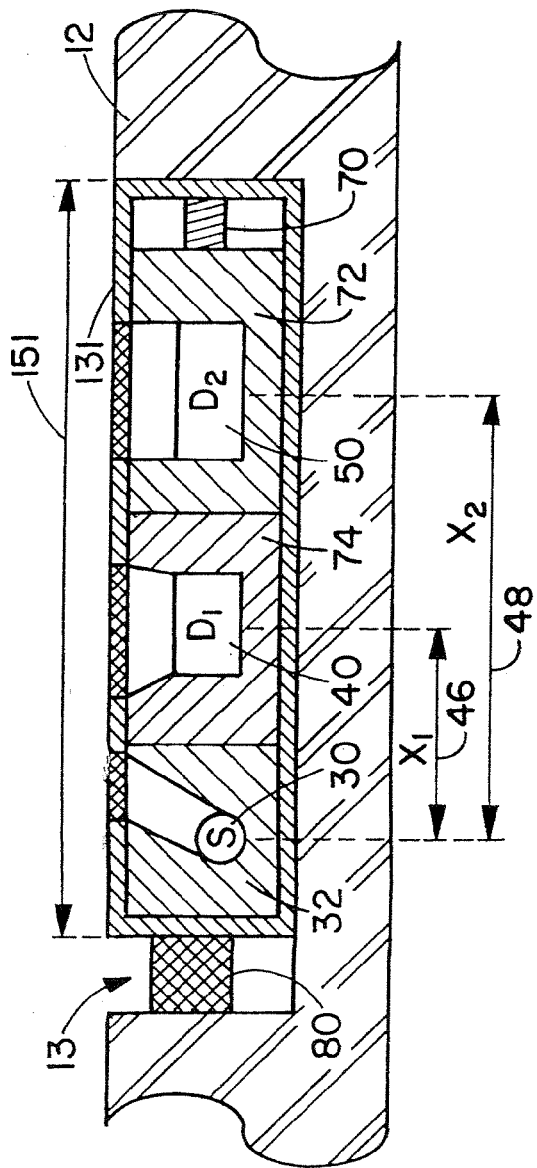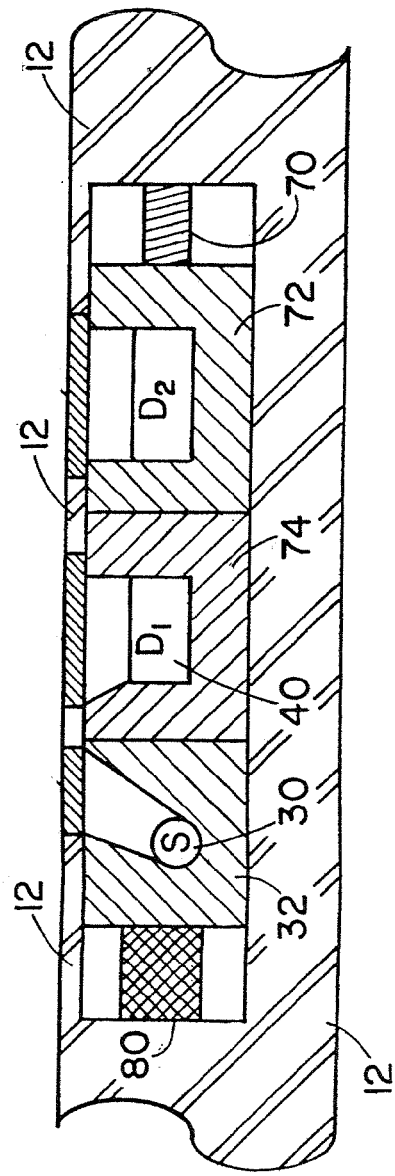
Fig. 6
Fig. 7

LOGGING TOOL WITH RESPONSE INVARIANT TO CHANGES IN BOREHOLE PRESSURE

This invention is directed toward a logging system for measuring parameters of earth formation penetrated by a well borehole, and more particularly directed toward a system that is not adversely affected by variations in borehole pressure. The basic concepts of the invention are applicable to nuclear, acoustic, electromagnetic, nuclear magnetic resonance (NMR) and other measurement systems that comprise one or more energy sources, and one or more axially spaced energy sensors or detectors, where system response is a function of the relative geometry of the source and detector. Furthermore, the basic concepts of the invention are applicable to any type of measurement system comprising an energy source and one or more energy detectors or sensors, where system response is a function of the relative geometry of the energy source and energy detector or sensor.

BACKGROUND OF THE INVENTION

Logging measurement systems have been used for decades to measure various properties of earth formation penetrated by a well borehole. The first systems used downhole instruments or "tools" which were conveyed along the borehole by means of a "wireline" cable. In addition, the wireline served as a means of communication between the downhole tool and equipment at the surface, which typically processes measured data to obtain formation parameters of interest as a function of depth within the borehole. These measurements are commonly referred to as "well logs" or simply "logs". Logging measurement systems can utilize nuclear, acoustic, electromagnetic, NMR and other types of measurements to obtain formation parameters of interest. For example, nuclear measurements can include measures of formation natural gamma radiation, thermal neutron flux, epithermal neutron flux elastic and inelastically scattered neutron, capture gamma radiation, scattered gamma radiation, and the like. A variety of formation parameters are obtained from these measurements, or combinations of these measurements, such as shale content, porosity, density, lithology and hydrocarbon saturation.

Wireline logging is applicable only after the borehole has been drilled. It was recognized in the 1960's that certain operational and economic advantages could be realized if drilling, borehole directional, and formation properties measurements could be made while the borehole is being drilled. This process is generally referred to as measurement-while-drilling (MWD) for real time drilling parameters such as weight on the drill bit, borehole direction, and the like. Formation property measurements made while drilling, such as formation density and formation porosity, are usually referred to as logging-while-drilling (LWD) measurements. The LWD measurements should conceptually be more accurate than their wireline counterparts. This is because the formation is less perturbed in the immediate vicinity of the borehole by the invasion of drilling fluids into the formation. This invasion alters the virgin state of the formation. This effect is particular detrimental to the more shallow depth of investigation nuclear logging measurements.

A brief summary of operating concepts of a nuclear density measurement system is presented so that the present invention can be more easily understood. The downhole instrument, or "tool", comprises typically a source of radiation and one or more radiation sensors or "detectors" axially spaced from the radiation source. For purposes of discussion, it will be assumed that the tool comprises a single source that emits gamma radiation, and two gamma ray detectors that are disposed within the tool at two axial spacings from the source. Gamma radiation is emitted by the source, passes through any material between the tool and the borehole wall, and enters the formation where it interacts with material within the formation. A portion of the radiation is scattered back into the borehole at a reduced energy. A portion of radiation scattered back into the borehole is recorded by the gamma ray detectors. Source gamma ray energy is selected so that the primary mode of reaction is Compton scatter, which is related to the electron density of the composite formation material including the formation matrix material and any fluid filling pore space within the matrix. Electron density is, in turn, related to the "bulk" density of the formation. The count rates measured by each gamma ray detector can, therefore, be related to the formation property of interest, which is bulk density. These relationships are determined by calibrating the tool under known borehole and formation conditions with "fixed" axial source-detector positionings. Stated another way, the tool is calibrated assuming that the spacings between the source and each detector remains constant while operating in a borehole environment. Gamma radiation not only interacts with the formation, but also with any intervening material between the tool and the borehole wall. This intervening material includes borehole fluid and particulate material, known as "mudcake", which builds up on the borehole wall due to invasion into the formation of borehole fluid. Mudcake and any other intervening material adversely affect the bulk density measurement. Responses of the two gamma ray detectors are combined to minimize the effects of mudcake and tool standoff. The "spine and rib" technique is known in the art as one method for combining the two detector responses.

A typical wireline scatter gamma ray density tool is constructed with a gamma ray source and one or more gamma ray detectors disposed within a "pad" which is mechanically forced against the borehole wall to minimize standoff effects. The pad is typically physically robust with minimal void space. Radical changes in pressure, which are typically encountered in a borehole environment, have minimal effect on the dimensions of the pad. As a result, source-detector geometry is relatively invariant to changes in borehole pressure. The response of the system, which is typically calibrated at atmospheric pressure with a fixed source-detector geometry, is typically minimally affected by large changes in borehole pressure.

An LWD scatter gamma ray density tool differs from its wireline counterpart in many aspects. One of the main differences stems from the fact that the source and detectors of a LWD scatter density tool are mounted in the drill collar rather than inside a wireline pressure housing, such as a pad. Such layout imposes certain restrictions on the size of the detectors, the length of a pressure housing containing the detectors, the robustness of the pressure housing, and the way the source, the detectors, and intervening radiation shielding are disposed in the collar. A typical layout of an LWD scatter density tool comprises a source shield, made of a heavy material such as tungsten, that is directly affixed to or fabricated as an integral part of the collar. The source shield typically comprises collimator passage openings or "window" covered with a light material relatively transparent to gamma radiation. Axially spaced detectors are typically disposed in a detector pressure housing, which is typically flexibly attached to the source housing. Stated another way, the source and detector housings are not rigidly attached to each other. Components within the detector pressure housing are at an ambient pressure, such as atmospheric pressure, at which the tool is calibrated. Detector shielding components are made of a heavy, gamma radiation absorbing material, such as tungsten. The shielding components also typically comprise collimator passages with windows covered with a light material relatively transparent to gamma radiation. The passages and windows are oriented in the pressure housing to collimate gamma radiation scattered from the borehole and formation environs. In one common embodiment, a stabilizer blade is then assembled over the source housing and the detector pressure housing. Under pressures encountered in the harsh borehole environment, the source remains in its original position since it is directly mounted to the collar. The detector pressure housing, however, compresses under this increased pressure. This compression changes the source-detector axial spacing from that at which the tool was calibrated. This change in source-detector spacings results in non-density related changes in count rate thereby yielding erroneous bulk density measurements.

Pressure related errors of type discussed above are typically more significant in LWD system than in wireline systems.

BRIEF DESCRIPTION OF THE DRAWINGS

So that the manner in which the above recited features, advantages and objects of the present invention are obtained and can be understood in detail, more particular description of the invention, briefly summarized above, may be had by reference to the embodiments thereof which are illustrated in the appended drawings.

FIG. 3a is a sectional view of major elements of a prior art dual detector LWD gamma ray density tool, taken along the major axis of the tool, with the tool at atmospheric pressure;

FIG. 3b is a sectional view of major elements of the prior art dual detector LWD gamma ray density tool, taken along the major axis of the tool, with the tool at elevated pressure;

FIG. 6 is a sectional view of major elements of a third embodiment of the tool of the present disclosure; and FIG. 7 is a sectional view of major elements of an embodiment of the tool in which the collar is used as a pressure housing.

DETAILED DESCRIPTION OF THE PREFERRED EMBODIMENTS

This invention is directed toward a logging system for measuring parameters of earth formation penetrated by a well borehole, wherein the response of the system is not adversely affected by geometric changes induced by variations in borehole pressure. The basic concepts of the invention are applicable to any type of logging system comprising one or more energy sources, and one or more axially spaced energy sensors, where system response is a function of the relative geometry of the source and sensor. These types include nuclear, acoustic, electromagnetic, NMR systems.

The concepts of the invention are applicable to both wireline logging systems and LWD systems. As an example, concepts of the invention can be used in a LWD neutron porosity system for measuring formation porosity, wherein the system comprises a neutron source and one or more axially spaced neutron sensors commonly referred to as neutron "detectors". As an additional example, the concepts of the invention are applicable to electromagnetic systems wherein the geometry of energy source or "transmitter" and sensor or "receiver" array is preferably invariant to borehole pressure.

Figure 1:
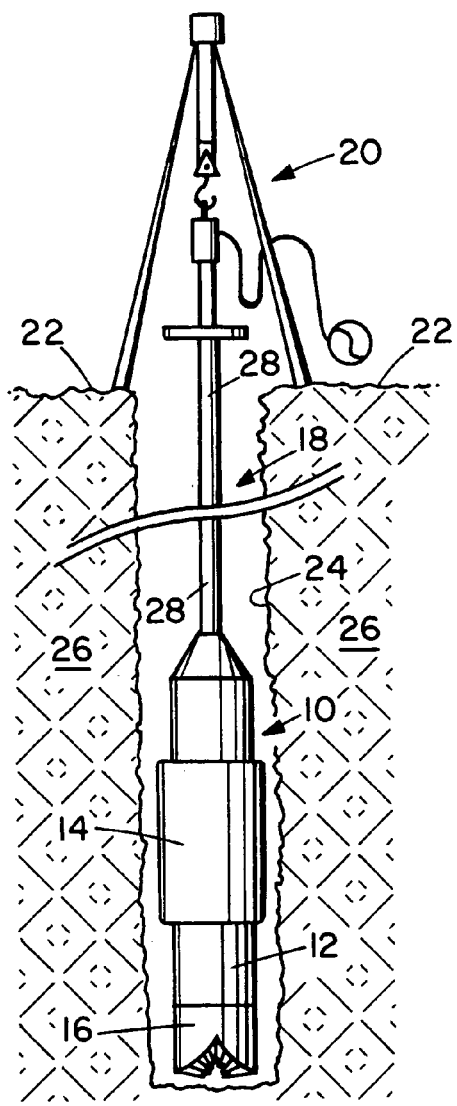
FIG. 1 illustrates a density system embodied as a logging-while-drilling system.

FIG. 1 illustrates an LWD tool, identified as a whole by the numeral 10, disposed by means of a drill string within a well borehole 18 defined by a borehole wall 24 and penetrating an earth formation 26. The upper end of the collar element 12 of the tool 10 is operationally attached to the lower end of a string of drill pipe 28. A stabilizer element of the tool 10 is identified by the numeral 14. The lower end of logging tool 10 is terminated by a drill bit 16. It should be understood, however, that other elements can be disposed on either end of the tool 10 between the drill pipe 28 and the drill bit 16. The upper end of the drill pipe 28 terminates at a rotary drilling rig 20 at the surface of the earth 22. The drilling rig rotates the drill pipe 28, the cooperating tool 10, and drill bit 16 thereby advancing the borehole 18. Drilling mud is circulated down the drill pipe 28, through the axial passage in the collar 12, and exits at the drill bit 16 to return to the surface 22 via the annulus defined by the outer surface of the drill string and the borehole wall 24. Details of the construction and operation of the drilling rig 20 are well known in the art, and are omitted in this disclosure for brevity.

Basic concepts are set forth in this disclosure using the invention embodied as a dual detector LWD gamma ray back scatter density system, wherein elements are configured to minimize errors caused by changes in pressure to which the system is exposed. As discussed above, the invention can also be effectively embodied in a variety of other types of LWD and wireline logging systems.

Figure 2:
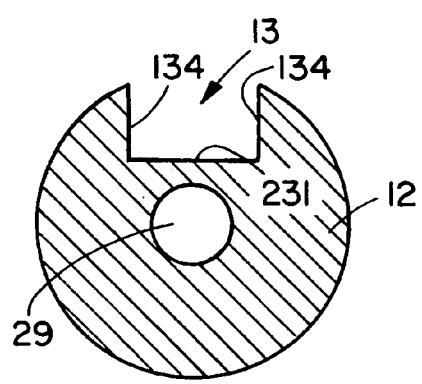
FIG. 2 is a partial cross section view perpendicular to the major axis of a collar showing a conduit through which drilling fluid is circulated during the drilling process.

FIG. 2 is a partial cross section view through the major axis of the collar 12 showing a conduit 29 through which drilling fluid is circulated during the drilling process. Also illustrated is a cavity 13 that is sized to receive elements of the tool, as will be discussed and illustrated in detail in subsequent sections of this disclosure. The cavity preferably extends axially along the major axis of the tool 10 with opposing walls 134 defining parallel planes that are normal to an inner surface 231.

FIG. 3a is a sectional view of major elements of a prior art dual detector gamma ray density tool along the major axis of the tool 10, and is used to conceptually illustrate sources of errors induced in density measurements by pressure variations in the borehole environment. Specific design parameters can be varied, but the disposition of these major elements serve to illustrate the borehole pressure problem.

Source housing 33 comprises a source of gamma radiation 30. The source 30 is preferably cesium-137 ($^{137}Cs$) which emits gamma radiation with an energy of 0.66 million electron volts (MeV). Alternately, cobalt-60 ($^{60}Co$) emitting gamma radiation at 1.11 and 1.33 MeV can be used as source material. High Z shielding material 32, such as tungsten (W), defines a passage 34 and collimates gamma radiation emitted by the source 30 into the borehole environs. At least a portion of the wall of the source collimator 34 (as shown in FIG. 3a) preferably forms an acute angle with the axis of the tool 10 to better focus gamma radiation into the formation.

Still referring to FIG. 3a, detector pressure housing 31 is disposed within the channel 13. The detector pressure housing 31 comprises a detector first or "short spaced" gamma ray detector 40 disposed at a first axial distance 46 from the source 30, and a second or "long spaced" gamma ray detector 50 disposed at a second axial distance 48 from the source, where the second spacing is greater than the first spacing as illustrated. Detectors 40 and 50 are disposed within rigidly affixed shielding materials 74 and 72, respectively. The shielding materials 74 and 72 are efficient attenuators of gamma radiation, or "high Z" material. The shielding materials 74 and 72 define passages 35 and 52 that collimate the short spaced and long spaced detectors 40 and 50, respectively, with respect to the borehole environs. Preferably a portion of the passage of at least the short spaced detector collimator 35 (as shown in FIG. 3a) forms an acute angle with the axis of the tool 10 to enhance sensitivity to angular sensitive Compton scattered gamma radiation emanating at preferred scatter angles from the borehole environs. Optionally, the long spaced detector collimator 52 can also be angularly collimated, but angular dependence of detected radiation decreases with source-detector spacing. The short spaced and long spaced detectors 40 and 50 are preferably of the scintillator type to increase detection efficiencies for given detector volumes. Sodium iodide or bismuth germinate are suitable scintillation crystal materials to be used in the scintillation type detectors. Again, W is a suitable high Z material 42.

Still referring to FIG. 3a, the right side of the shielding material 72 is attached to the inside wall of the detector pressure housing 31 by means of a detector housing spring 62. Right hand side outer wall of the detector pressure housing 31 is rigidly attached to the collar 12. The detector pressure housing 31 is flexibly attached to the source housing 33 by a main spring 60.

The detector pressure housing 31 comprises "windows" 38 and 54 covering the collimator passages 35 and 52 of the short spaced detector 40, and the long spaced detector 50, respectively. The source housing 31 comprises a window 36 covering the collimator passage 34 from the source 30. The windows are preferably fabricated from low atomic number or "low Z" material which minimizes gamma radiation absorption. Various epoxies, ceramics and the like are suitable low Z material. Axes of the source, long and short spaced detector collimator windows 36, 38 and 54, respectively, are in the plane defined by the major axis of the collar 12 and the center of the surface 231 of the cavity 13 (see FIG. 2).

It is noted that additional source and detector shielding material (not shown) can be disposed outside of the pressure housings 33 and 38, with suitable collimation to allow passage of gamma radiation.

An electronics package (not shown), comprising power supplies and electronic circuitry required to power and control the detectors, is located remote from the pressure housing 31, but preferably located downhole and within the collar 12. The electronics package is electrically connected to the detectors. The electronics package can also include recording and memory elements to store measured data for subsequent retrieval and processing when the tool 10 is returned to the surface of the earth.

Gamma radiation recorded in the long and short spaced detectors 50 and 40, respectfully, are functions of both the bulk density of the formation material in which the tool is positioned, and axial spacings 46 and 48 of short spaced detector 40 and long spaced detector 50, respectively, from the source 30. The tool response is "calibrated" for fixed spacings and under known conditions, as is known in the art. Calibration typically is performed at the surface of the earth at atmospheric pressure. Under these conditions, the length of the detector pressure housing 31 is illustrated by the arrow 44. The source to short spaced detector $X_1$ and source to long spaced detector $X_2$ are illustrated by the arrows 46 and 48, respectively.

As the tool is conveyed into the well borehole, pressure increases. The increase in pressure compresses the detector pressure housing 31 axially. Referring to FIG. 3b, the detector pressure housing 31 compresses by an amount 65 to an axial dimension 144. Since the right hand side of the detector pressure housing is affixed to the collar 12, shielding elements 74 and 72 move to the right thereby compressing the detector assembly spring 62. The left hand side of source housing 33 is rigidly affixed to the collar 12. The holder and source 30 therein do not move. The main spring 60 expands to compensate for the compression of the detector pressure housing 31. Under pressure, the spacing $X_{1,p}$ identified at 46 between the source and the detector increases. Likewise, under pressure the spacing $X_{2,p}$ identified at 48 increases. An increase in pressure changes the source-detector spacings. Mathematically, $X_{1,p} > X_1$ and $X_{2,p} > X_2$. These changes in spacing induce detector count rate changes that are not related to formation bulk density. Stated another way, changes in pressure to which the tool is exposed introduces error in formation density measurements. A change of as small as 0.01 inches (0.254 millimeters) of the source-detector spacing can result in a large change in the measured density, especially for the short spaced detector spacing 46. For a typical short spaced detector spacing 46 of 6 inches (152.4 millimeters), a 0.05 inch compression in the pressure housing can result in as much as 0.2 grams per cubic centimeter error in density measured by the short spaced detector 40. Such an error deems a density log unusable, as can be seen by processing count rate data using the previously referenced spine-and-rib method.

The previously discussed adverse effects of pressure are virtually eliminated by the manner in which the major elements of the tool are operationally connected. Several embodiments can be used to obtain this borehole pressure invariance. Furthermore, elements for compensation for compression and expansion are not limited to a spring. These compensation elements can comprise any material that can be reversibly distorted In addition to springs, compensation elements can comprises an elastic material such as an elastomer, a gas filled cylinder, or any material or assembly that reversibly distorts under pressure.

Figure 4A:
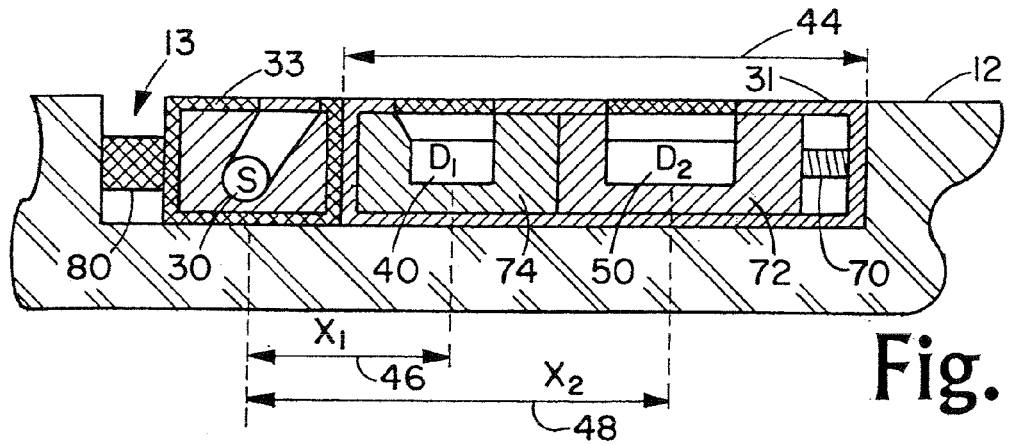
FIG. 4a is a sectional view of major elements of a first embodiment of the tool of the present disclosure, taken along the major axis of the tool, with the tool at atmospheric pressure.

FIG. 4a illustrates a LWD dual detector density source-detector array disposed in a pressure housing 31, with some identifying numbers shown in FIGS. 3a and 3b being omitted for clarity. It is assumed that the array shown in FIG. 4a is at atmospheric pressure. The source housing 33 containing the source 30 is disposed within the channel 13. The detector pressure housing 31 is likewise disposed in the channel 13, and rigidly attached to the source housing 33 as illustrated. The left side of the source housing 32 is flexibly attached to collar 12 by means of a main compensation element 80. Hereafter, the shielding materials 74 and 72 with associated collimators 35 and 52, respectively, will be referred to simply as "shields" 74 and 72. Shields 74 and 72, with short spaced and long spaced detectors 40 and 50, respectively, disposed therein, are rigidly attached to each other. The right hand side of the shield 72 is flexibly attached to the inner wall of the detector pressure housing 31 by means of a detector compensation element 70. The right hand end of the detector pressure housing 31 is rigidly attached to the collar 12. Dimensions 44, 46 and 48 represent the axial length of the detector pressure housing, short and long detector spacings, respectively.

Figure 4B:
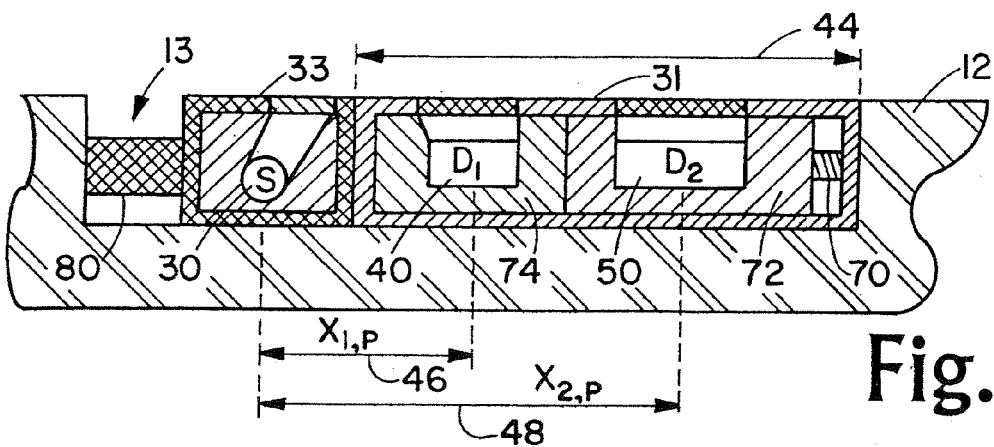
FIG. 4b is a sectional view of major elements of the first embodiment of the tool of the present disclosure, taken along the major axis of the tool, with the tool at elevated pressure.

Attention is directed to FIG. 4b, which illustrates the effects of increased borehole pressure. As discussed preciously, an increase in borehole pressure compresses the detector pressure housing 31 thereby reducing the axial dimension 44. The detector compensation element 70 compresses thereby allowing the short and long spaced detectors (and associated shields 74 and 72, respectively) to slide to the right within the detector pressure housing 31. Since the source housing 33 is rigidly attached to the detector housing 31, the source 30 is moved the same axial distance to the right. The main compensation element 80 expands to account for the displacement of the source housing. Since the source housing 32 and rigidly attached detector pressure housing 31 are equally displaced axially within the channel 13, the original short space and long spaced detector spacings 46 and 48, respectively (at which the tool was calibrated) is preserved. Resulting density determinations are not, therefore, adversely affected by increases in borehole pressure. The axial extents of the low Z windows 38 and 54 are greater than the maximum openings of the collimation channels 35 and 52, respectfully. This allows the detectors housings 74 and 72 to move axially within the detector pressure housing 31, and still maintain full coverage of the respective collimators with low Z material. As pressure is reduced, as is the case when the tool is moved up the well borehole, the pressure housing 31 expands, and the detector compensation element 70 expands accordingly, and the main compensation element 80 compresses thereby maintaining the desired source-detector spacings 46 and 48. It is noted that any external shielding is preferably rigidly attached to the detector housing and hence moves in the same direction and with the same magnitude as pressure induced variations in the pressure housing.

Figure 5:
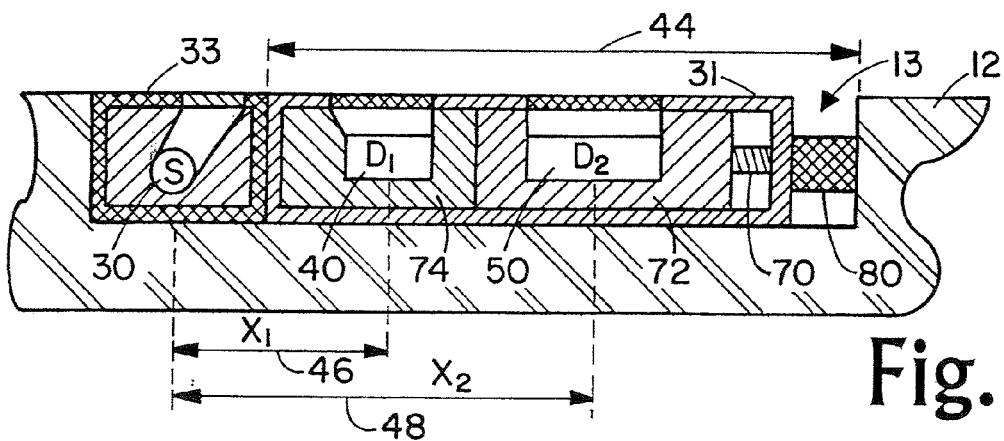
FIG. 5 is a sectional view of major elements of a second embodiment of the tool of the present disclosure.

FIG. 5 illustrates another embodiment of an LWD dual detector density source-detector array disposed in a pressure housing 31, with some identifying numbers again being omitted for clarity. The source housing 33 containing the source 30 is disposed within the channel 13. The detector pressure housing 31 is likewise disposed within the channel 13, and rigidly attached to the source housing 33 as illustrated. In this embodiment, the left side of the source housing 32 is rigidly attached to the inner wall of the collar 12. Shields 74 and 72, with short spaced and long spaced detectors disposed therein, are rigidly attached to each other. The right hand side of the shield 72 is flexibly attached to the inner wall of the detector pressure housing 31 by means of a detector compensation element 70. The left hand side of the shield 74 is rigidly attached to the source housing 33. The right side of the detector pressure housing 31 is flexibly attached to the collar 12 through the main compensation element 80. Comparing the embodiment shown in FIG. 4a with the embodiment shown in FIG. 5, it is apparent that the short and long detector spacings 48 and 46, respectfully, are invariant to changes in the axial length 44 of the detector pressure housing 31. Compensation mechanics are essentially the same as discussed in connection with FIGS. 4a and 4b, but with the main compensation element 80 being disposed on the opposite end of the source-detector array.

FIG. 6 shows a LWD dual detector density source-detector array disposed in a common pressure housing 131. The right hand end of the common pressure housing 131 is rigidly attached to the collar 12. The left hand end of the common pressure housing is flexibly attached to the collar via the main compensation element 80. For purposes of discussion, it is assumed that the common pressure housing is exposed to atmospheric pressure. The source shield 32 with the source 30 therein, the short spaced detector shield 74 with the short spaced detector 40 disposed therein, and the long spaced detector shield 72 with the long spaced detector 50 disposed therein, are all rigidly attached. The right hand side of the shield 72 is flexibly attached to the inner wall of the common pressure housing, as shown in FIG. 6. As pressure increases, the common pressure housing 131 compresses, and the dimension 151 is reduced. The source shield 32 with the source 30 therein, the short spaced detector shield 74 with the short spaced detector 40 disposed therein, and the long spaced detector shield 72 with the long spaced detector 50 disposed therein all move to the right with common pressure housing compression. The main compensation element 80 expands, and the detector compensation element 70 compresses. The source-detector dimensions 46 and 48 remain constant, thereby yielding density measurements invariant to borehole pressure.

FIG. 7 shows a LWD dual detector density source-detector array disposed within a cavity in the wall of the collar 12, which serves as a pressure housing. The source shield 32, the short spaced detector shield 74, and the long spaced detector shield 72 are all rigidly attached to one another as illustrated. The long spaced detector shield 72 is flexibly attached to the collar 12 via the detector compensation element 70. The source shield 32 is flexibly attached to the collar 12 via the main compensation element 80. The compensation elements 70 and 80 are optionally used as mounting elements. These compensation elements are not required for spacing compensation since all elements within the collar remains at atmospheric pressure.

In the embodiments of the invention discussed above and illustrated in FIGS. 4a, 4b, 5, 6 and 7, the main compensation element 80 and the detector compensation element 70 are preferably springs.

While the foregoing disclosure is directed toward the preferred embodiments of the invention, the scope of the invention is defined by the claims, which follow.

What is claimed is:

1. A tool for operating in a borehole, said tool comprising:
   (a) a tool housing;
   (b) a source disposed within said tool housing;
   (c) at least one detector axially spaced from said source and disposed within said tool housing;
   (d) a detector compensation element cooperating with said at least one detector; and
   (e) a main compensation element cooperating with said source; wherein
   (f) said main compensation element and said detector compensation element render axial spacing between said source and said at least one detector invariant to borehole pressure changes.

2. The tool of claim 1 further comprising:
   (a) a source housing in which said source is disposed; and
   (b) a detector pressure housing containing said at least one detector and said detector compensation element; wherein (i) said tool housing comprises a drill collar,
(ii) said source housing is rigidly attached to said drill collar,
(iii) said detector pressure housing is rigidly attached to said source housing and flexibly attached to said drill collar by means of said main compensation element, and
(iv) said at least one detector is flexibly attached to said detector housing by means of said detector compensation element.

3. The tool of claim 1 further comprising:
(a) a source shield in which said source is disposed;
(b) a detector shield in which said at least one detector is disposed; and
(c) a common pressure housing containing said source shield and said detector shield and said detector compensation element; wherein
(i) said tool housing comprises a drill collar,
(ii) a first end of said common pressure housing is flexibly attached to said drill collar by means of said main compensation element,
(iii) a second end of said common pressure housing is rigidly attached to said drill collar, and
(iv) said detector shield is flexibly attached to said common pressure housing by means of said detector compensation element.

4. The tool of claim 1 further comprising:
(a) a source shield in which said source is disposed;
(b) a detector shield in which said at least one detector is disposed; and
(c) a common pressure housing containing said source shield and said detector shield and said detector compensation element; wherein
(i) said tool housing comprises a drill collar,
(ii) a first end of said common pressure housing is rigidly attached to said drill collar,
(iii) a second end of said common pressure housing is flexibly attached to said drill collar by means of said main compensation element, and
(iv) said detector shield is flexibly attached to said common pressure housing by means of said detector compensation element.

5. The tool of claim 1 further comprising:
(a) a source shield in which said source is disposed; and
(b) a detector shield in which said at least one detector is disposed; wherein
(c) said tool housing comprises a drill collar;
(d) said source shield and said detector shield are disposed within a cavity in the wall of said drill collar;
(e) said source shield is flexibly attached to said drill collar by means of said main compensation element; and
(f) said detector shield is flexibly attached to said drill collar by means of said detector compensation element.

6. The tool of claim 1 wherein:
(a) said source emits gamma radiation;
(b) two detectors are disposed within said tool housing and at different axial spacings from said source; and
(c) said two detectors are responsive to gamma radiation.

7. The tool of claim 6 wherein density of material penetrated by said borehole is determined by combining count rates measured by said two detectors.

8. The tool of claim 1 wherein said tool is conveyed along said borehole by a drill string.

9. The tool of claim 1 wherein said main compensation element comprises a spring.

10. A tool for operating in a borehole, said tool comprising:
(a) a tool housing;
(b) a source disposed within said tool housing;
(c) at least one detector axially spaced from said source and disposed within said tool housing;
(d) a detector compensation element cooperating with said at least one detector,
(e) a main compensation element cooperating with said source;
(f) a source housing in which said source is disposed; and
(g) a detector pressure housing containing said at least one detector and said detector compensation element; wherein
(i) said tool housing comprises a drill collar,
(ii) either said source housing or said detector pressure housing is flexibly attached to said drill collar, and
(iii) said main compensation element and said detector compensation element render axial spacing between said source and said at least one detector invariant to borehole pressure changes.

11. The tool of claim 10 wherein:
(a) said source housing is flexibly attached to said drill collar by means of said main compensation element;
(b) said detector pressure housing is rigidly attached to said source housing and rigidly attached to said drill collar; and
(c) said at least one detector is flexibly attached to said detector pressure housing by means of said detector compensation element.

12. The tool of claim 10 wherein:
(a) said source housing is rigidly attached to said drill collar;
(b) said detector pressure housing is rigidly attached to said source housing and flexibly attached to said drill collar by means of said main compensation element; and
(c) said at least one detector is flexibly attached to said detector housing by means of said detector compensation element.

13. The tool of claim 10 further comprising a common pressure housing containing said source shield and said detector shield and said detector compensation element, wherein:
(a) a first end of said common pressure housing is flexibly attached to said drill collar by means of said main compensation element;
(b) a second end of said common pressure housing is rigidly attached to said drill collar; and
(c) said detector shield is flexibly attached to said common pressure housing by means of said detector compensation element.

14. The tool of claim 10 further comprising a common pressure housing containing said source shield and said detector shield and said detector compensation element, wherein:
(a) a first end of said common pressure housing is rigidly attached to said drill collar;
(b) a second end of said common pressure housing is flexibly attached to said drill collar by means of said main compensation element; and
(c) said detector shield is flexibly attached to said common pressure housing by means of said detector compensation element.

15. The tool of claim 10 wherein:
(a) said source shield and said detector shield are disposed within a cavity in the wall of said drill collar;

(b) said source shield is flexibly attached to said drill collar by means of said main compensation element; and (c) said detector shield is flexibly attached to said drill collar by means of said detector compensation element.

16. A method for measuring a parameter in a borehole, said method comprising:

(a) providing a tool housing;
(b) disposing a source within said tool housing;
(c) disposing within said tool housing at least one detector axially spaced from said source and;
(d) providing a detector compensation element which cooperates with said at least one detector; and
(e) providing a main compensation element which cooperates with said source; wherein
(f) said main compensation element and said detector compensation element render axial spacing between said source and said at least one detector invariant to borehole pressure changes.

17. The method of claim 16 further comprising:
(a) disposing said source in a source housing; and
(b) disposing said at least one detector and said detector compensation element in a detector pressure housing; wherein
(i) said tool housing comprises a drill collar,
(ii) said source housing is rigidly attached to said drill collar,
(iii) said detector pressure housing is rigidly attached to said source housing and flexibly attached to said drill collar by means of said main compensation element, and
(iv) said at least one detector is flexibly attached to said detector pressure housing by means of said detector compensation element.

18. The method of claim 16 further comprising:
(a) disposing said source in a source shield;
(b) disposing said at least one detector in a detector shield; and
(c) disposing said source shield and said detector shield and said detector compensation element in a common pressure housing; wherein
(i) said tool housing comprises a drill collar,
(ii) a first end of said common pressure housing is flexibly attached to said drill collar by means of said main compensation element,
(iii) a second end of said common pressure housing is rigidly attached to said drill collar, and
(iv) said detector shield is flexibly attached to said common pressure housing by means of said detector compensation element.

19. The method of claim 16 further comprising:
(a) disposing said source in a source shield;
(b) disposing said at least one detector in a detector shield; and
(c) disposing said source shield and said detector shield and said detector compensation element in a common pressure housing; wherein
(i) said tool housing comprises a drill collar,
(ii) a first end of said common pressure housing is rigidly attached to said drill collar,
(iii) a second end of said common pressure housing is flexibly attached to said drill collar by means of said main compensation element, and
(iv) said detector shield is flexibly attached to said common pressure housing by means of said detector compensation element.

20. The method of claim 16 further comprising:
(a) disposing said source in a source shield; and
(b) disposing said at least one detector in a detector shield; wherein
(c) said tool housing comprises a drill collar;
(d) said source shield and said detector shield are disposed within a cavity in the wall of said drill collar;
(e) said source shield is flexibly attached to said drill collar by means of said main compensation element; and
(f) said detector shield is flexibly attached to said drill collar by means of said detector compensation element.

21. The method of claim 16 wherein:
(a) said source emits gamma radiation;
(b) two detectors are disposed within said tool housing;
(c) said two detectors are responsive to gamma radiation; and
(d) said two detectors are disposed at different axial spacings from said source.

22. The method of claim 21 further comprising combining count rates measured by said two detectors to determine density of material penetrated by said borehole.

23. The method of claim 16 comprising the additional step of conveying said tool housing along said borehole with a drill string.

24. The method of claim 16 wherein said main compensation element comprises a spring.

25. A method for measuring a parameter in a borehole, said method comprising:
(a) providing a tool housing;
(b) disposing a source within said tool housing;
(c) disposing within said tool housing at least one detector axially spaced from said source;
(d) providing a detector compensation element which cooperates with said at least one detector;
(e) providing a main compensation element which cooperates with said source;
(f) disposing said source in a source housing; and
(g) disposing said at least one detector and said detector compensation element in a detector pressure housing; wherein
(i) said tool housing comprises a drill collar,
(ii) either said source housing or said detector pressure housing is flexibly attached to said drill collar, and
(iii) said main compensation element and said detector compensation element render axial spacing between said source and said at least one detector invariant to borehole pressure changes.

26. The method of claim 25 wherein:
(a) said source housing is flexibly attached to said drill collar by means of said main compensation element;
(b) said detector pressure housing is rigidly attached to said source housing and rigidly attached to said drill collar; and
(c) said at least one detector is flexibly attached to said detector pressure housing by means of said detector compensation element.

27. The method of claim 25 wherein:
(a) said source is rigidly attached to said drill collar;
(b) said detector pressure housing is rigidly attached to said source housing and flexibly attached to said drill collar by means of said main compensation element; and
(c) said at least one detector is flexibly attached to said detector pressure housing by means of said detector compensation element.

28. The method of claim 25 further comprising:
(a) disposing said source in a source shield;
(b) disposing said at least one detector in a detector shield; and
(c) disposing said source shield and said detector shield and said detector compensation element in a common pressure housing; wherein
  (i) a first end of said common pressure housing is flexibly attached to said drill collar by means of said main compensation element,
  (ii) a second end of said common pressure housing is rigidly attached to said drill collar, and
  (iii) said detector shield is flexibly attached to said common pressure housing by means of said detector compensation element.

29. The method of claim 25 further comprising:
(a) disposing said source in a source shield;
(b) disposing said at least one detector in a detector shield; and
(c) disposing said source shield and said detector shield and said detector compensation element in a common pressure housing, wherein
  (i) a first end of said common pressure housing is rigidly attached to said drill collar,
  (ii) a second end of said common pressure housing is flexibly attached to said drill collar by means of said main compensation element, and
  (iii) said detector shield is flexibly attached to said common pressure housing by means of said detector compensation element.

30. The method of claim 25 further comprising:
(a) disposing said source in a source shield; and
(b) disposing said at least one detector in a detector shield; wherein
(c) said source shield and said detector shield are disposed within a cavity in the wall of said drill collar;
(d) said source shield is flexibly attached to said drill collar by means of said main compensation element; and
(e) said detector shield is flexibly attached to said drill collar by means of said detector compensation element.

31. An LWD density logging system for logging a well borehole, the system comprising:
(a) a drill collar comprising
  (i) a collar wall defined by an inner collar surface and an outer collar surface, and
  (ii) a cavity within said collar wall and opening at said outer collar surface;
(b) a source of gamma radiation disposed within a high Z source shield, wherein a source pathway in said high Z source shield extends radially outward from said source thereby forming a source collimator window;
(c) a detector pressure housing rigidly disposed within said cavity and rigidly attached to said high Z source shield, the detector pressure housing comprising
  (i) a short spaced gamma ray detector disposed in a first high Z shield and spaced axially at a first distance from said gamma ray source,
  (ii) a long spaced gamma ray detector disposed in a second high Z shield and spaced axially at a second distance from said gamma ray source, wherein said second distance is greater than said first distance, and wherein said second high Z shield is rigidly attached to said first high Z shield,
  (iii) a first pathway in said first high Z shield extending radially outward from said short spaced detector thereby forming a short spaced detector collimator window,
  (iv) a second pathway in said second high Z shield extending radially outward from said long spaced detector thereby forming a long spaced detector collimator window, and
  (v) a detector compensation element flexibly attaching said second high Z shield to said detector pressure housing;
(d) a main compensation element that flexibly attaches said high Z source shield to said drill collar; wherein
(e) said main compensation element and said detector compensation element render said first distance and said second distance invariant to a variation in the axial length of said detector pressure housing.

32. The system of claim 31 wherein:
(a) said source of gamma radiation and said high Z source shielding are disposed within a source housing;
(b) said source housing is rigidly attached to said detector pressure housing; and
(c) said source housing is flexibly attached to said drill collar by means of said main compensation element.

33. The system of claim 31 wherein openings defined by outward bounds of said source pathway and said first pathway and said second pathway are covered with a low Z material.

34. The system of claim 31 wherein said main compensation element comprises a spring and said detector compensation element comprises a spring.

35. The system of claim 31 further comprising a processor for combining responses of said short spaced detector and said long spaced detector to obtain a measure of density of material penetrated by said borehole.

36. A method for measuring density of material penetrated by a borehole and while drilling said borehole, the method comprising:
(a) providing a drill collar comprising
  (i) a collar wall defined by an inner collar surface and an outer collar surface, and
  (ii) a cavity within said collar wall and opening at said outer collar surface;
(b) disposing, within said cavity, a source of gamma radiation within a high Z source shield, wherein a source pathway in said high Z source shield extends radially outward from said source thereby forming a source collimator window;
(c) rigidly disposing a detector pressure housing within said cavity, wherein said detector pressure housing comprises
  (i) a short spaced gamma ray detector disposed in a first high Z shield and spaced axially at a first distance from said gamma ray source,
  (ii) a long spaced gamma ray detector disposed in a second high Z shield and spaced axially at a second distance from said gamma ray source, wherein said second distance is greater than said first distance, and wherein said second high Z shield is rigidly attached to said first high Z shield,
  (iii) a first pathway in said first high Z shield extending radially outward from said short spaced detector thereby forming a short spaced detector collimator window, (iv) a second pathway in said second high Z shield extending radially outward from said long spaced detector thereby forming a long spaced detector collimator window, and
(v) a detector compensation element flexibly attaching said second high Z shield to said detector pressure housing;
(d) rigidly attaching said high Z source shield to said detector pressure housing; and
(e) flexibly attaching said high Z source shield to said drill collar by means of a main compensation element; wherein
(f) said main compensation element and said detector compensation element render said first distance and said second distance invariant to a variation in the axial length of said detector pressure housing.

37. The method of claim 36 further comprising:
(a) disposing said source of gamma radiation and said high Z source shielding within a source housing;
(b) rigidly attaching said source housing to said detector pressure housing; and
(c) flexibly attaching said source housing to said drill collar by means of said main compensation element.

38. The method of claim 36 wherein openings defined by outward bounds of said source pathway and said first pathway and said second pathway are covered with low Z material.

39. The method of claim 36 wherein said main compensation element comprises a spring and said detector compensation element comprises a spring.

40. The method of claim 36 further comprising combining responses of said short spaced detector and said long spaced detector in a processor to obtain a measure of density of material penetrated by said borehole.

41. The method of claim 36 further comprising conveying said drill collar along said borehole with a drill string.

42. An LWD density logging system for logging a well borehole, the system comprising:
(a) a drill collar comprising
   (i) a collar wall defined by an inner collar surface and an outer collar surface, and
   (ii) a cavity within said collar wall and opening at said outer collar surface;
(b) a common pressure housing disposed within said cavity and comprising
   (i) a short spaced gamma ray detector disposed in a first high Z shield and spaced axially at a first distance from a gamma ray source,
   (ii) a long spaced gamma ray detector disposed in a second high Z shield and spaced axially at a second distance from said gamma ray source, wherein said second distance is greater than said first distance, and wherein said second high Z shield is rigidly attached to said first high Z shield,
   (iii) a first pathway in said first high Z shield extending radially outward from said short spaced detector thereby forming a short spaced detector collimator window,
   (iv) a second pathway in said second high Z shield extending radially outward from said long spaced detector thereby forming a long spaced detector collimator window,
   (v) a detector compensation element flexibly attaching said second high Z shield to said common pressure housing; and
   (vi) a source of gamma radiation disposed within a high Z source shield, wherein a third pathway in said high Z source shield extends radially outward from said source thereby forming a source collimator window, and wherein said high Z source shield is rigidly attached to said first high Z shield; and
(c) a main compensation element that flexibly attaches one end of said common pressure housing to said drill collar; wherein
(d) said main compensation element and said detector compensation element render said first distance and said second distance invariant to a variation in the axial length of said common pressure housing.

43. A method for measuring density of material penetrated by a borehole and while drilling said borehole, the method comprising:
(a) providing a drill collar comprising
   (i) a collar wall defined by an inner collar surface and an outer collar surface, and
   (ii) a cavity within said collar wall and opening at said outer collar surface;
(b) disposing a common pressure housing within said cavity, wherein said common pressure housing comprises
   (i) a short spaced gamma ray detector disposed in a first high Z shield and spaced axially at a first distance from a gamma ray source,
   (ii) a long spaced gamma ray detector disposed in a second high Z shield and spaced axially at a second distance from said gamma ray source, wherein said second distance is greater than said first distance, and wherein said second high Z shield is rigidly attached to said first high Z shield,
   (iii) a first pathway in said first high Z shield extending radially outward from said short spaced detector thereby forming a short spaced detector collimator window,
   (iv) a second pathway in said second high Z shield extending radially outward from said long spaced detector thereby forming a long spaced detector collimator window,
   (v) a detector compensation element flexibly attaching said second high Z shield to said common pressure housing; and
   (vi) a source of gamma radiation disposed within a high Z source shield, wherein a third pathway in said high Z source shield extends radially outward from said source thereby forming a source collimator window, and wherein said high Z source shield is rigidly attached to said first high Z shield; and
(c) flexibly attaching one end of said common pressure housing to said drill collar by means of a main compensation element; wherein
(d) said main compensation element and said detector compensation element render said first distance and said second distance invariant to a variation in the axial length of said common pressure housing.

44. A tool for operating in a borehole, said tool comprising:
(a) a source;
(b) at least one sensor axially spaced from said source and responsive to energy emitted by said source;
(c) a detector compensation element cooperating with said at least one sensor; and
(d) a main compensation element cooperating with said source; wherein (e) said main compensation element and said detector compensation element render axial spacing between said source and said at least one sensor invariant to borehole pressure changes.

45. A method for measuring a parameter in a borehole environs, the method comprising:
(a) providing a source;
(b) axially spacing at least one sensor from said source wherein said at least one sensor yields a response to said source;
(c) providing a detector compensation element cooperating with said at least one sensor;
(d) providing a main compensation element cooperating with said source; and
(e) determining said parameter from said response of said at least one sensor; wherein
(f) said main compensation element and said detector compensation element render axial spacing between said source and said at least one sensor invariant to borehole pressure changes.

* * * * *